UNITED STATES PATENT OFFICE.

JEHYLEMAN SHAW, OF BRIDGEPORT, CONNECTICUT.

IMPROVEMENT IN PROCESSES OF RECOVERING GOLD AND SILVER FROM WASTE SOLUTIONS.

Specification forming part of Letters Patent No. 35,842, dated July 8, 1862; reissue No. 1,651, dated April 5, 1864; reissue No. 3,506, dated June 15, 1869; reissue No. 4,030, dated June 14, 1870; reissue No. 4,970, dated July 9, 1872.

DIVISION B.

*To all whom it may concern:*

Be it known that I, JEHYLEMAN SHAW, of Bridgeport, in the county of Fairfield and State of Connecticut, have invented a new and useful process for recovering the gold and silver from what are known in the arts as the washings or waste solutions of photography; and I do hereby declare the following to be a sufficiently clear, full, and exact description thereof to enable those skilled to understand and use the invention.

Previous to my invention it was customary in the practice of the art of photography to allow the washings or waste and spent solutions to run off, and the gold and silver therein contained to be lost, because there was no known process or method by which the gold and silver contained in very small quantities in such solutions could be recovered economically enough to render the use of such process remunerative or advantageous. It had long been known that various chemical ingredients would operate as "precipitants" of gold and silver held in solution; and in the arts some of these known "precipitants" were generally employed, the most generally used in the arts for the precipitation of silver being common salt for "nitrate solutions" of silver, and muriatic acid for the "cyanide solutions." These two solutions of silver were in fact about the only ones in use in the arts at the time photographic waste solutions came into existence (as consequents to the collodion process of photography) and in the extraction of the silver common salt was most used and best adapted to be as a precipitant of the nitrate solution (of the assayer) and muriatic acid as a precipitant of the cyanide solution of the electroplater; though, as I have said, it was known to chemists that other materials—such for instance as protosulphate of iron, muriate of tin, soluble sulphuret of potassa, &c.—would operate as precipitants of silver.

I discovered by experiment and observation that in the practice of photography only about or less than one-fourth of the silver used remained in picture, and consequently at least three-fourths of all the silver used ran to waste in the washings, and I set to work to devise means for the economic recovery of the silver from the washings; but upon the application of the best known precipitants—viz., salt and muriatic acid—I discovered that these precipitants would not serve the desired purpose at all. I found that these precipitants, though the best in use in connection with such solutions as were before known in the arts, (because they would throw down the silver in pure chloride of silver unmixed with other metal,) were useless as precipitants of the silver of these photographic washings, because in the latter there was such a minute quantity of silver compared with the quantity of solution, and because of the totally different chemical character of these diluted solutions I found that the salt, which would throw down most of the silver in the usual "nitrate" solutions used in the arts would not answer as a precipitant of the new kind of solutions which possessed so small an amount of silver, and were made up of the iodide and bromide of silver, together with the cyanide of potassium, hyposulphate of soda, &c., and which would hold the silver in solution, no matter how much salt might be added, and I found that muriatic acid could not be used with any practical success because it would not precipitate unless enough were added to decompose the alkalies, and this would cost more than the silver to be recovered was worth.

Finding the nature of these new solutions (in which existed the silver to be recovered) was entirely different from that of solutions before known in the arts, that the same course of treatment for "precipitation" could not be successfully applied to them with any advantageous results, and finding nowhere any instruction to those skilled in the arts for recoving the silver from such solutions, I set to work to learn the precise nature of the solutions, and what precipitants could be successfully used with them, if any, and how such precipitants should be applied.

It will be understood that, as in the photographic art, there are several different kinds of washings or waste solutions, it was necessary to experiment with each separately, as what might induce to a certain chemical action on one might not effect another, and that as the question of economy in the ingredients employed and in the working of the process were vital essentials, because of the minute amount of silver obtainable from a very large quantity of the washings, it would be necessary to find some simple and cheap process by which all the washings could be treated and all the silver recovered. In the course of a long series of experiments I discovered that while salt would throw down most of the silver in the "negative bath" solution, and that many other precipitants would throw down the silver from some of the solutions, many of the precipitants would answer for one and not for another of the solutions; that some were too expensive and some were so slow in their action that too much accumulation of the solutions and complication of apparatus would be required in practice; and I discovered that, of all things known in chemistry as "precipitants" of the silver and gold held in solution, the sulphuret of potassium was the only material which could be successfully employed to precipitate the gold and silver from the mixed washings or waste solutions; and as the problem to be solved required the treatment of all the solutions together, or the treatment of the "mixed washings," the discovery of the capacity of the sulphuret of potassium to effect this result enabled me to accomplish the new object aimed at—viz., the recovery, in a practically successful manner, of all the silver from all the waste washings and spent solutions of the photographic establishment.

It will be understood, then, that based upon this discovery rests my invention, which consists in the use, in any suitable apparatus in which the spent solutions or mixed washings of the photographer are accumulated, of the sulphuret of potassium, to precipitate from such solutions all their contained gold and silver.

In carrying out this precipitation of the metals the precipitant should be so applied that the washings will come into contact all the time with it to keep up the chemical action, and so that its action cannot be impeded or impaired by any accumulation about it of the sediment or deposit; and to gain these objects, which are essential, I propose to provide a suitable vessel (adapted either to catch the washings from the sinks or basins, or to answer as a substitute for such receptacles for washings) in which is provided a bag or cage for holding the precipitant, arranged near where the washings enter the vessel, and some distance above the locality at which the deposit will form. I propose to have this vessel divided into compartments and otherwise so made that the washings can come in continual fresh contact with the "precipitant," and so that the particles precipitated will be prevented from flowing off or escaping with the water and its other contained ingredients.

The construction and operation of the apparatus alluded to will be found fully described in another application filed simultaneously with this, and forming the subject for Letters Patent for said apparatus.

It will be understood that in the treatment of such solutions as those to which my invention relates the quantity of gold and silver to be recovered (or contained in them) is very minute compared with the quantity of solution to be treated, and that the whole amount of contained silver does not exceed the percentage of silver which generally remains in the assayer's solution after he has performed on such solution the usual process of precipitation; and it will be understood that in the treatment of the mixed washings with the sulphuret of potassium, as described, the washings come into contact with the precipitant (receptacle) and dissolving portions of it mingle therewith, and a reaction takes place among the elements present, the silver, leaving the elements with which it was combined, unites with the sulphur, and, forming a precipitant, settles down to the bottom of the vessel. As the waste solutions are slowly and almost continually entering the vessel, (during the progress of the business of washing the pictures) they come into contact with the precipitant, and as the freshly-supplied solution is entering into the process of precipitation that which has undergone it is gradually passing on toward the bottom of the vessel, and thence up to the exit, and the precipitate passes on down and settles with the mass or deposit at the bottom of the vessel.

In practicing my process for the recovery of the silver from mixed waste washings of photographers I propose to use such an apparatus as described in and made the subject of the other application filed by me simultaneously with this, but it will be understood, however, that the invention made the subject of this application may be practiced in a different apparatus, the gist of my invention resting in the idea of extracting the silver by bringing the mixed washings and spent solutions into contact, substantially as described, with the sulphuret of potassium.

Having explained my invention so that those skilled can readily understand it, what I claim as new, and desire to secure by Letters Patent, is—

The within-described process for recovering the silver and gold from spent or mixed photographic solutions and washings by the use of sulphuret of potassium, substantially as described.

In testimony whereof I have hereunto set my hand and seal this 1st day of June, 1872.

JEHYLEMAN SHAW. [L. S.]

In presence of—
J. N. McINTIRE,
JACOB FELBEL.